Aug. 28, 1928.  
J. M. CORY ET AL  
1,682,369  
METHOD OF DISPOSING OF ACID SLUDGE AND SPENT CLAY IN OIL REFINING PLANTS  
Filed Jan. 27, 1926
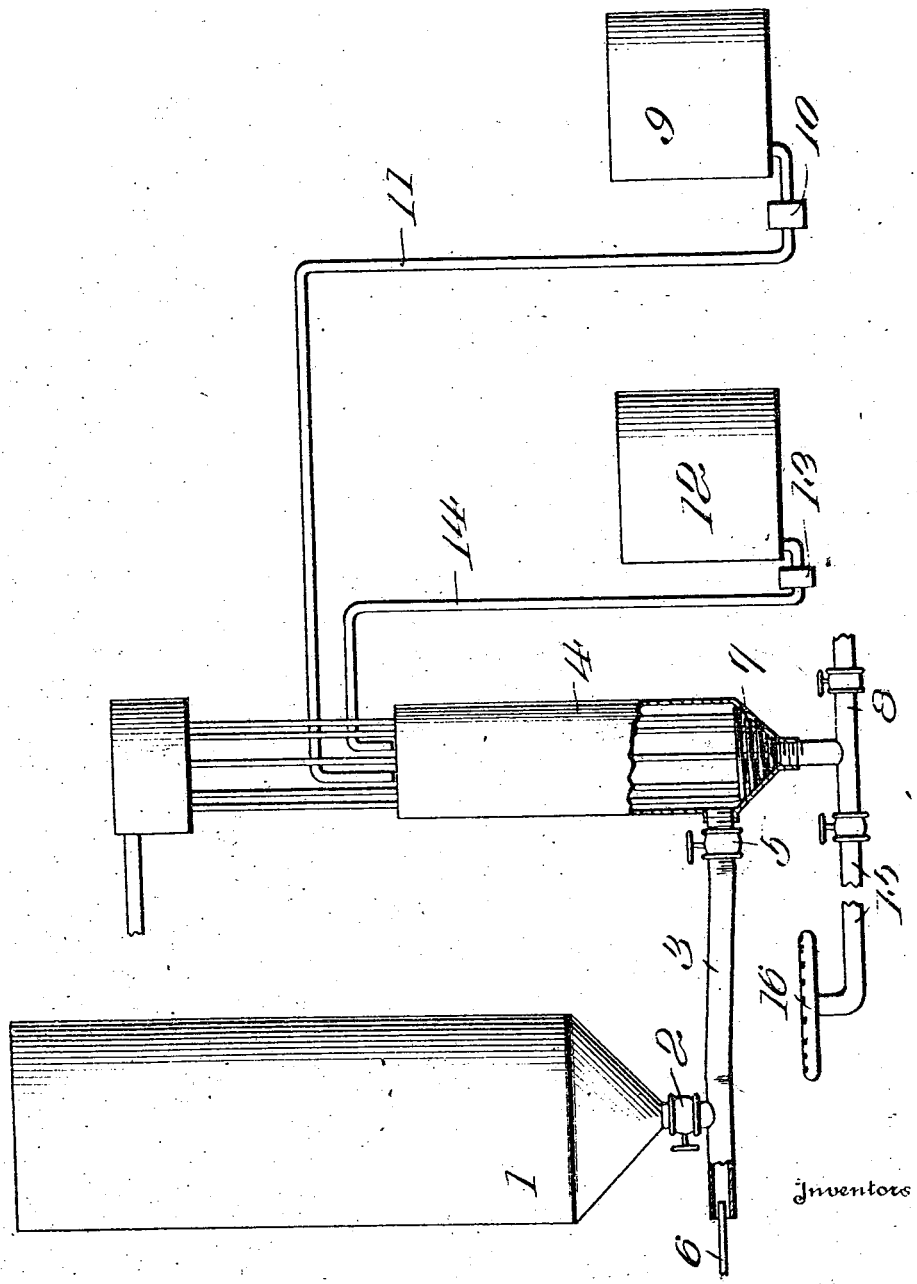
Inventors  
J.M. CORY and  
F.H. BUNKE.  
By  
Attorney Patented Aug. 28, 1928.

1,682,369

UNITED STATES PATENT OFFICE.

JAMES M. CORY AND FRED H. BUNKE, OF LIMA, OHIO, ASSIGNORS TO THE SOLAR REFINING COMPANY, OF LIMA, OHIO, A CORPORATION OF OHIO.

METHOD OF DISPOSING OF ACID SLUDGE AND SPENT CLAY IN OIL-REFINING PLANTS.

Application filed January 27, 1926. Serial No. 84,163.

This invention relates to a method of disposing of acid sludge and spent clay in oil refining plants, the object being to provide a method by means of which acid sludge and spent clay used in refining oils can be converted into a liquid fuel and consumed so that these useless products can be disposed of and a fuel produced and used in a refining plant.

Acid sludge is a product formed when hydrocarbon oils are treated with acids such as sulphuric acid or hydrochloric acid and is known in the oil trade as the pitchy material that settles in the bottom of the agitator after acids, such as sulphuric acid, hydrochloric acid or any other acids have been added to the hydrocarbon oil for the purpose of doing what is known as treating the petroleum in the refining trade.

Spent clay is what is known in the oil refining trade as the used clay resulting from the use of clay in combination with hydrocarbon, vegetable or animal oil to refine or brighten such oils.

The method is especially designed for the disposition of the products known as acid sludge and used filtering mediums, such as fuller's earth, clay, plaster of Paris or other similar products.

In the drawing we have shown diagrammatically one form of an apparatus for carrying out our improved method for the disposition of acid sludge and a filtering medium by producing a liquid fuel and burning the same, in which 1 indicates an ordinary agitator in which acids, such as sulphuric acid, is added to petroleum for the purpose of treating. The acid sludge resulting from such treatment is allowed to settle in the bottom of said agitator and is drawn or forced off.

In the form of apparatus shown the agitator is provided with a conical bottom having a valve controlled outlet 2 in communication with a pipe line 3 which is connected to an agitator 4 and is provided with a valve 5. A suitable steam jet 6 is disposed in the end of the pipe line so that the acid sludge can be forced into the agitator 4, but, of course, it is understood that any suitable means for conveying the acid sludge from the agitator 1 to the agitator 4 can be used, as the same can be allowed to flow by gravity or any other suitable conveying means can be employed.

The agitator 4 is provided with steam coils 7 having steam jets so that an even distribution of live or exhaust steam will be released in the bottom of the agitator so as to heat and agitate the contents of said agitator and while we have shown a particular form of heating coil in which the feed line pipes extend through the top thereof and are connected to a header, it is, of course, understood that the particular construction is immaterial so long as live or exhaust steam is released in the agitator for the purpose of heating and agitating the contents thereof.

The acid in the acid sludge which is delivered from the agitator 1 into the agitator 4 is allowed to settle and is drawn off through the pipe line 8.

Spent clay or any other suitable filtering medium is delivered into a tank 9 and oil is mixed with this filtering medium and the same thoroughly agitated until it is of the right consistency so that it will flow. This mixed product is then forced by a pump 10 through a pipe line 11 into the agitator 4 and at the same time live steam is being introduced into the agitator 4 so that the clay and oil is mixed with the acid sludge.

As this agitation continues in the agitator 4, fuel oil, tank bottoms, other low gravity petroleum products or other burnable fluxing medium from a tank 12 is delivered into the agitator 4 by a pump 13 through the line 14 until the mixture within the agitator 4 is of such a consistency that it will burn satisfactorily in a liquid fuel burner.

The liquid fuel thus produced in the agitator 4 is then forced or drawn off by gravity through a pipe line 15 to a liquid burner 16 disposed under a still or boiler of the oil refining plant and used.

The fuel thus produced within the agitator is maintained in a liquid form by a continuous agitation of the entrance of live or exhaust steam so that it will be maintained at the right consistency and it is, of course, understood that it could be stored in a suitable tank and maintained in a liquid state so that it could be forced from this tank to a burner.

The method of converting acid sludge and filtering medium into a commercially useful burnable product as developed by us is as follows:—

The acid sludge formed when hydrocarbons or petroleum oils are mixed with sulphuric acid or hydrochloric acid or other acids is removed from the bottom of the agitator by the use of a jet of live steam and blown into an agitator or tank, the particular manner of conveying the acid sludge from the main agitator to the tank or agitator used to produce the burning fuel being immaterial.

The tank into which the acid sludge is deposited is fitted with steam coils from which live or exhaust steam may be forced into and mixed with the contents of the tank. The acid contained in the acid sludge is now allowed to settle (as much as will) and is drawn from the bottom of the tank or container.

The spent clay treated with an oil as described above or any other solid such as coke or coal dust, plaster of Paris, dalmetios earth, colloidal clay, bauxite, fuller's earth, pyrophyllite, montmorillonite or similar substances held in suspension in oil, tar or pitch or like substances, is now pumped into the acid sludge from which a portion of the acid has been removed and at the same time live or exhaust steam is introduced into the coils until the clay or other above-mentioned material is thoroughly mixed with the pitch or/and sludge. Fuel oil, tank bottoms or other low gravity petroleum products or other burnable fluxing medium is now added until the mixture is of such a consistency that it will burn satisfactorily in a liquid fuel burner. The fuel is now kept in agitation with steam and may be pumped direct to burners or other tanks where it is kept in agitation with steam.

Our method can also be carried out in the following manner: Acid sludge formed in the agitator when the hydrocarbon or petroleum oils are mixed with a suitable acid, is removed from the bottom of the agitator and conveyed to a tank in which live or exhaust steam is being liberated so as to thoroughly heat and agitate the acid sludge delivered thereto. The acid contained in the acid sludge is now allowed to settle and is drawn off from the bottom of the tank or container. Spent clay or any other finely ground material, such as coke or coal dust, plaster of Paris, dalmetios earth, colloidal clay, bauxite, fuller's earth, pyrophyllite, montmorillonite or similar substances is then delivered to the tank or container in which the acid sludge is being agitated by the live or exhaust steam and at the same time fuel oil, tank bottoms or other low gravity petroleum products is delivered into the tank or container and these products are thoroughly mixed together in order to produce a liquid fuel of such a consistency that it will flow readily and will burn satisfactorily in a liquid fuel burner.

This method differs from the first method only in the use of a dry comminuted material instead of a comminuted material being held in suspension in oil, as we have found that the acid sludge by mixing a comminuted material and oil therewith produces a valuable fuel oil.

From the foregoing description it will be seen that we have provided an exceedingly simple and novel method of forming a liquid fuel from the waste products of an oil refining plant which not only utilizes these products to produce a useful fuel, but also disposes of these products.

What we claim is:—

1. The method of preparing a liquid fuel consisting in mixing acid sludge, a filtering medium and a fluxing medium together in the presence of a heating medium.

2. The method of preparing a liquid fuel, consisting in mixing acid sludge, spent clay and tank bottoms together in the presence of steam.

3. The method of preparing a liquid fuel, consisting in mixing acid sludge, spent clay and oil together in the presence of steam.

4. The herein described method of making a fluid fuel from acid sludge and a filtering medium consisting in first removing the greater portion of acid from said sludge, second treating the filtering medium with a carrying medium and then mixing the sludge and treated filtering medium with a fluxing medium in the presence of a heating medium.

5. The herein described method of making a fluid fuel from acid sludge, fluxing medium and a comminuted material consisting in first removing a greater portion of acid from the sludge, second treating the comminuted material with oil and then mixing the sludge and comminuted material together with oil in the presence of steam.

6. The method of manufacturing a fluid fuel consisting in first mixing oil with a filtering medium, then mixing the product produced with acid sludge and oil in the presence of steam.

7. The method of manufacturing a fluid fuel consisting in first mixing oil with a filtering medium until the filtering medium is held in suspension in oil, then mixing the product produced with acid sludge and a fluxing medium in the presence of steam.

8. The method of manufacturing a fluid fuel consisting in mixing acid sludge, comminuted material and oil together in the presence of steam.

9. The method of manufacturing a fluid fuel consisting in mixing acid sludge, comminuted material and a fluxing medium together in the presence of steam.

10. The method of manufacturing a fluid fuel consisting in mixing acid sludge, spent clay and oil together in the presence of steam.

11. The method of producing commercial fuel from acid sludge consisting in introducing into the acid sludge comminuted material and oil and mixing the same in the presence of steam.

12. The method of producing commercial fuel from acid sludge consisting in introducing into acid sludge a filtering medium and a fluxing medium and mixing the same in the presence of a liberated heating medium.

13. A liquid fuel composed of acid sludge, a filtering medium and a fluxing medium.

14. A liquid fuel composed of acid sludge, spent clay and oil.

15. A liquid fuel composed of acid sludge, comminuted material and oil.

16. The method of making a fluid fuel from acid sludge consisting in first removing a greater portion of the acid from the sludge and then introducing into the sludge a comminuted material and oil in the presence of steam.

17. The method of manufacturing a fluid fuel consisting in mixing acid sludge, comminuted material and oil together in the presence of steam.

18. The herein described method of manufacturing a fluid fuel consisting in removing a portion of the acid from acid sludge and simultaneously mixing the acid sludge, comminuted material and oil in the presence of steam.

In testimony whereof we hereunto affix our signatures.

JAMES M. CORY.
FRED H. BUNKE.